United States Patent [19]
Mizuno et al.

[11] 3,888,843
[45] June 10, 1975

[54] 4-CARBAMOYL-1-β-D-RIBOFURANOSYLIMIDAZOLIUM-5-OLATE

[75] Inventors: Kimio Mizuno; Takuji Ando; Masatoshi Tsujino; Masaki Takada; Munetoshi Yoshizawa; Tetsuo Matsuda; Mitsuo Hayashi, all of Shizuoka, Japan

[73] Assignee: Toyo Jozo Kabushiki Kaisha, Shizuoka-ken, Japan

[22] Filed: June 12, 1973

[21] Appl. No.: 365,794

[52] U.S. Cl........... 260/211.5 R; 195/28 N; 424/180
[51] Int. Cl............................................. C07d 51/52
[58] Field of Search ............................ 260/211.5 R

[56] References Cited
UNITED STATES PATENTS
3,798,209   3/1974   Witkowski et al. .......... 260/211.5 R Primary Examiner—Johnnie R. Brown
Attorney, Agent, or Firm—Young & Thompson

[57] ABSTRACT

Bredinin, which is 4-carbamoyl-1-β-D-ribofuranosylimidazolium-5-olate, has immunosuppressive activity. For its production, microorganism Eupenicillium brefeldianum is cultivated in a nutrient medium and the immunosuppressive agent is isolated therefrom.

1 Claim, No Drawings

4-CARBAMOYL-1-B-D-RIBOFURANOSYLIMIDAZULIUM-5-OLATE

This invention relates to a novel immunosuppressive agent, 4-carbamoyl-1-β-D-ribofuranosylimidazolium-5-olate, hereinafter designated as bredinin, having the formula

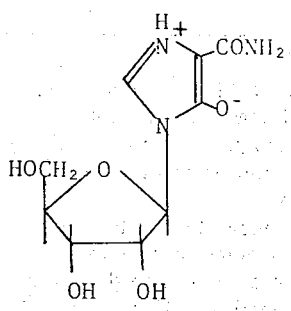

and a process for the production thereof.

The inventors of the present invention have found that a microorganism belonging to Eupenicillium produced a compound of Formula I having immunosuppressive and antiviral activities in a cultured medium, and hereinafter designated as bredinin.

Heretofore, Virazol [1-β-ribofuranosyl-1,2,4-triazol-3-carboxamide], Pyrazomycin [3(5)-ribofuranosyl-4-hydroxypyrazol-5(3)-carboxamide], Cytosine arabinoside (1-β-D-arabinofuranosyl cytosine) and Azathioprine Imuran, 6-[(1-methyl-4-nitroimidazol-5-yl)-thio] purine have been known as the compounds having antiviral and/or immunosuppressive activities.

Recently there has been great demand for an effective immunosuppressive agent for use during organ transplant operations and these agents, especially Imuran, are frequently used for that operation. However, relatively high toxicity makes impossible their continuous administration.

An object of the present invention is to provide a novel low toxic immunosuppressive agent bredinin of Formula I above.

Another object of the present invention is to provide a process for production of bredinin comprising cultivating a bredinin-producing microorganism belonging to genus Eupenicillium and isolating the bredinin having an immunosuppressive activity therefrom.

In the present invention *Eupenicillium brefeldianum* [refer to Stolk, A.C., Persoonia, 4, 391 (1967); Raper, K.B., A Manual of the Penicillia, page 141 (1949)] is used as the bredinin-producing microorganism. The said microorganism has been deposited at the Institute for Microbial Industry and Technology, Agency of Industrial Science & Technology, Japan as FERM-P No. 1104. The said strain has also been deposited at the United States Department of Agriculture, Northern Marketing and Nutrition Research Division and added to its permanent collection as NRRL 5734.

According to an embodiment of the present invention *Eupenicillium brefeldianum* NRRL 5734 (FERM-P No. 1104) is cultured in a conventional manner. It can be cultured as a solid culture or in a liquid culture medium; however, for industrial production submerged aeration culture may preferably be applied.

For the medium, there may be used a conventional nutrient medium for microorganism cultivation. Assimilable carbon sources such as glucose, sucrose, lactose, maltose, starch, dextrin, molasses, glycerin and the like may be used as a carbon source. Assimilable nutrient nitrogen sources such as corn steep liquor, soy bean powder, cotton seed powder, wheat gluten, peptone, meat extract, yeast extract, casein hydrolysate, ammonium salt, nitrate and the like are used. A salt such as a phosphate (magnesium, calcium, potassium, sodium, zinc, ferrous, ferric or manganese) can also be used if necessary.

The cultivating temperature will be selected so as to control growth of the microorganism and production of bredinin, and preferably is 26°–30°C. Cultivation time may depend on the conditions and it may preferably be 40–70 hours. When the produced bredinin has its highest activity, the cultivation should be terminated.

The bredinin is recovered in a liquid filtrate and not in a mycelial cake. Bredinin is a water-soluble substance, difficultly soluble in most organic solvents and especially insoluble in water-immiscible organic solvents, so it is impossible to extract by solution in organic solvents. Therefore, it may preferably be isolated by weak acidification of bredinin or insolubility in an organic solvent. Since bredinin has a weak antimicrobial activity, it can be assayed by the conventional cup method using *Candida albicans* as a test organism.

An embodiment of isolation and purification procedures for bredinin is as follows: A cultured filtrate of *Eupenicillium brefeldianum* NRRL 5734 (FERM-P No. 1104) is adjusted to pH 9.0 and passed through a hydroxy type of strong basic anion exchange resin, for example Amberlite IRA-411 (trade name of Rohm and Haas Co., U.S.A.), to absorb the bredinin. The resin is eluted with 2% aqueous acetic acid and the eluent is optionally further treated with the strong basic anion exchange resin, and the eluate is concentrated in vacuo to obtain an oily residue which is pulverized by adding methanol and acetone, to a greyish white powder. The said powder is dissolved in a small amount of water and passed through a silica gel column thereby obtaining violet active fractions which are dried in vacuo. The powder is dissolved in water, thereafter is saturated with hydrogen sulfide gas to liberate the chelating metals. Further purification can be carried out by dissolving the crude powder of bredinin in 0.1 mole pyridine - acetic acid buffer solution and the said solution is passed through a column of DEAE-Sephadex A-25 (trade name of cross linked diethyl aminoethyl dextran gel, product of Pharmacia Co., Sweden). Bredinin is recrystallized from the active eluate upon adding methanol, as white crystals.

The physico-chemical properties of bredinin are as follows:

1. Elemental analysis:
   Found: C: 41.70%, H: 5.06%, N: 16.21%, O: 37.03%
2. Molecular weight and molecular formula:
   Found: 265 (by titration).
   Theoretical: 259.22 as $C_9H_{13}N_3O_6$
3. Melting point:
   >200°C. (decomposed, brown colored)
4. Optical rotation:
   $[\alpha]_D^{27} = -35°$ (C=0.8, $H_2O$)
5. Ultra violet absorption spectrum (in $H_2O$):
   $\lambda_{max}$: 245 mμ, $E_{1\ cm}^{1\%} = 250$
   $\lambda_{max}$: 279 mμ, $E_{1\ cm}^{1\%} = 580$
6. Infra red absorption spectrum (KBr tablet):
   Absorption bands at 3420, 3130, 2925, 2770, 1625, 1540, 1445, 1300, 1260, 1195, 1130, 1100, 1080, 1055, 980, 873, 829, 770, 740, 725, 560 cm$^{-1}$ 7. Color reactions:
   Positive: ferric chloride, Molisch, potassium permanganate, Pauli and Ehrlich.
   Negative: Tolens, Fehling, Dragendorf, Leidon-Smith, Isatin, Sakaguchi and Ninhydrin.
8. Solubility:
   Easily soluble: water
   Slightly soluble: methanol
   Hardly soluble: ethanol
   Insoluble: most common organic solvents
9. pKa: Weak acidic (pKa 6.75)
10. Color and appearance: white crystals.
11. Stability:
   Does not inactivate at pH 2–9, at 60°C., for 30 mins.

The chemical structure of bredinin is theoretically quite reasonable for Formula I hereinbefore in accordance with determinations by X-ray analysis. However, there is naturally included in the present invention any other theoretically reasonable structural formula should Formula I in fact prove to be wrong.

The biological properties of bredinin are as follows:
1. Toxicity:
   1. Acute toxicity:
   >1.5g./kg. (i.v., mice) >2.4 g./kg.(i.p., mice)
   Survivals more than 1 week were observed when administered intra peritoneally for 4 days, 500 mg./kg./day.
   2. Observation of blood at continuous administration:
   Observations of blood when bredinin and imuran are administered to mice for 8 days are illustrated in Table 1.

Table 1

|  | Leucocyte count/mm$^3$ | Erythrocyte count/mm$^3$ | Hemoglobin g./dl. |
|---|---|---|---|
| CONTROL | 5200 | 924 × 10$^4$ | 8.7 |
|  | 7400 | 917 × 10$^4$ | 9.2 |
|  | 4700 | 821 × 10$^4$ | 9.4 |
| Bredinin | 5900 | 981 × 10$^4$ | 11.0 |
| 100 mg./kg./day | 4900 | 877 × 10$^4$ | 10.1 |
|  | 6600 | 793 × 10$^4$ | 8.8 |
| Imuran | 1900 | 620 × 10$^4$ | 7.0 |
| 100 mg./kg./day | 1800 | 758 × 10$^4$ | 6.8 |
|  | 2600 | 640 × 10$^4$ | 7.2 |

Bredinin is as shown in Table 1 lower in decrease of leucocyte count than Imuran.

2. Antimicrobial activity:
   Bredinin has no antibacterial activity, but has weak inhibitory activity against *Candida albicans*.
3. Immunosuppressive activity:
   1. 4 days successive administration of bredinin:
   4 × 10$^8$ of sheep red blood cells (hereinafter designated as SRBC) are injected intravenously into three groups each of 10 mice, ddY strain, male. For 2 groups, bredinin, 50 mg./kg./day and 100 mg./kg./day respectively, is successively administered intraperitoneally for 4 days thereafter.
   Hemolysin titer and plaque forming cells in spleen are observed on the fourth day after SRBC immunization. The results are shown in Table 2.

Table 2

|  | Hemolysin titer | Plaque forming cells/spleen |
|---|---|---|
| CONTROL | 40 | 31.4 × 10$^4$ |
| Bredinin (50 mg./kg./day) | 10 | 6.7 × 10$^4$ |
| Bredinin (100 mg./kg./day) | ≥5 | 1.8 × 10$^4$ |

As shown in Table 2, immunosuppressive action is observed at 50 mg./kg./day for 4 days' consecutive administration, and plaque forming cells in the spleen are suppressed on the order of 1/20 at 100 mg./kg./day's administration.

2. Effect of single dose of bredinin:
SRBC are injected intravenously in mice. At the same time (0th day), and on the 1st, 2nd and 3rd days after SRBC injection, 200 mg./kg. of bredinin are administered intraperitoneally. In the 4th day, hemolysin titer and plaque forming cells in the spleen are determined. The results are shown in Table 3.

Table 3

|  | Control | Bredinin administration (200 mg./kg.) on | | | |
|---|---|---|---|---|---|
|  |  | 0th day | 1st day | 2nd day | 3rd day |
| Hemolysin titer | 40 | 40 | 40 | 10 | 20 |
| Plaque forming cells/spleen (×10$^4$) | 31.4 | 31.8 | 33.1 | 11.2 | 18.2 |

As illustrated in Table 3, little immunosuppressive activity is observed when bredinin is administered on the same day (0th day) or on the 1st day after SRBC injection. When bredinin is administered on the 2nd day, the highest immunosuppressive activity is observed and also somewhat weaker suppression is observed on the 3rd day.

3. Effect on the antibody production to thymus independent antigen formation:
As a result of experiments using E. coli endotoxin, bredinin does not inhibit the immune process of thymus independent antigen.

4. Effect on secondary response:
SRBC (4 × 10$^8$) are injected intraperitoneally in four groups of 10 mice each. After 21 days, 4 × 10$^8$ of SRBC are again injected intravenously in three groups, and at the same time, 100 mg./kg./day of bredinin and imuran are adminstered intraperitoneally for 3 days, once a day. Hemolysin titer and plaque forming cells in the spleen after 3 days of the second SRBC injection are illustrated in Table 4.

Table 4

|  |  | Hemolysin titer | Plaque forming cells/spleen |
|---|---|---|---|
| Control | Secondary immunization | 40 | 15.3 × 10$^4$ |
|  | No secondary immunization (primary immunization only) | 5 | 0.19× 10$^4$ |
| Bredinin (100 mg./kg.) |  | 5 | 3.1 × 10$^4$ |
| Imuran (100 mg./kg.) |  | 20 | 8.3 × 10$^4$ |

Bredinin is effective for secondary antibody responce, but imuran has very weak activity therefor.

As illustrated hereinbefore has stronger immunosuppressive activity than imuran not only for primary antibody but also for secondary immune response. This fact indicates the great advantages of bredinin of the present invention, for clinical application, because the antigen stimulation is continuous after organ transplant or in the case of autoimmune diseases.

4. Effect on virus multiplication:
1. Effects of bredinin on multiplication of Herpes simplex virus, Polio virus, Hemagglutinating virus of Japan and Vaccinia virus are tested in vitro determined and there is no inhibitory activity except in connection with Vaccinia virus.

Mouse embryo primary cells are cultured in a medium containing bredinin, and after 24 hours 100 $TCID_{50}$ (Tissue Culture Infective Dose 50%) of virus are inoculated therein. Observation is carried out after 72 hours and the results are shown in Table 5.

Table 5

| Bredinin ($\gamma$/ml.) | 100 | 20 | 4 | 0.8 | 0.16 | Control |
|---|---|---|---|---|---|---|
| Cytopathic effect | − | − | − | − | + | +++ |

2. Effect of influenza virus infection:

The ddY strain, weight 14–16 g., HVJ (hemagglutinating virus of Japan) -free mice are used for experiment. Infectious virus, Influenza $A_2$ Kumamoto strain ($H_2N_2$) is previously multiplied in the allantoic cavity of embryonated eggs, and 1/250 ml. of virus solution per mouse is administered by inhalation using a vaponephrine type nebulizer as an inhalator. The compressor of the inhalator is adjusted to spray 10 ml. of virus solution in 30 minutes.

Administrations of bredinin and imuran are performed twice, each 3 and 1 hours before virus infection, and twice, each 1 and 3 hours after infection, and further administered for 5 days twice a day intraperitoneally. Results are shown in Table 6.

Table 6

|  | Bredinin | | Imuran | | Control |
|---|---|---|---|---|---|
| Dose (mg./kg.) | 25 | 5 | 25 | 5 | Saline |
| No. of mice treated | 10 | 10 | 10 | 10 | 40 |
| Survivals/Treat. | 8/10 | 7/10 | 10/10 | 6/10 | 4/40 |

As illustrated hereinabove, bredinin is effective for experimental influenza virus infection in mice and has almost the same degree of curative effect as imuran. 90% of the mice in the control group are dead on the 15th day after infection.

5. Antitumor activity:

Bredinin shows weak antitumor activity for Ehrlich ascites tumor and leukemia L-1210 in mice.

The followings are examples of the present invention:

EXAMPLE 1

100 ml. of aqueous medium (pH 6.5) containing glucose 2%, potato extract (prepared from 300 g. of potato slices and water 1 liter, boiled for 1 hour) 10%, cotton seed powder 0.5%, $KH_2PO_4$ 0.5% and $MgSO_4 . 7H_2O$ 0.25% were introduced in a 500 ml. flask and sterilized at 120°C. for 15 minutes. Into this medium, spore of Eupenicillium brefeldianum NRRL 5734 (FERM-P No. 1104) was inoculated and rotatory shake cultured at 300 r.p.m., at 26°C. After 48 hours, the cultured medium was transferred to 20 l. of the same medium hereinabove in a 30 l. jar fermenter and cultured at 26°C., with agitation at 300 r.p.m. and aeration of 20 l./min., for 49 hours.

The thus-cultured medium was transferred into 200 l. of previously sterilized aqueous medium (pH 6.5) containing glucose 2%, peptone 1%, corn steep liquor 1%, $KH_2PO_4$ 0.2%, $MgSO_4 . 7H_2O$ 0.1% and antifoaming agent 0.1% in a 300 l. stainless steel fermentation tank and cultured at 26°C., with agitation at 350 r.p.m., and aeration of 200 l./min., for 55 hours to obtain the cultured broth (pH 5.9) containing 50 mcg./ml. of bredinin. The broth was adjusted to pH 9.0 by adding 50% aqueous sodium hydroxide and filtered to obtain 170 l. of clear filtrate. The said filtrate was passed through a column (diameter 15 cm.) of 20 l. of Amberlite IRA-411 (OH type) at a flow rate of 300 ml./min. to absorb the material and washed with 50 l. of water. Elution was carried out with 2% aqueous acetic acid and each 5 l. of eluate was fractionated. Active fractions were found in fractions Nos. 7 to 9 assayed by Candida albicans as a test organism. The active fractions were collected, adjusted to pH 9.6 with 50% aqueous sodium hydroxide, then passed through 4 l. of Amberlite IRA-411 (OH type) in a column (diameter 7.5 cm.), washed with water, thereafter eluted with 2% aqueous acetic acid to obtain fractions of 500 ml. each. Active fractions were found at fractions Nos. 13 to 18, which were collected and concentrated in vacuo to obtain 200 ml. of oily residue. The residue was well mixed with 400 ml. of methanol and 200 ml. of acetone and precipitated by centrifugation at 3000 r.p.m. for 10 minutes. The precipitate was washed with acetone and dried in vacuo to obtain 50 g. of crude bredinin (purity 10%) as a greyish white powder.

EXAMPLE 2

Crude bredinin powder obtained in Example 1 is dissolved in a small amount of water and suspended in a solvent mixture defined hereinbelow and charged on 500 ml. of silica gel (60–80 mesh) in a column (diameter 4.0 cm.) packed with a solvent mixture of n-butanol : acetic acid : water (10 : 1 : 2), and thereafter developed with the same solvent mixture. Each 500 ml. of the eluent was fractionated and active fractions were found in fractions Nos. 5 to 7 showing violet color. The said active fractions were collected and dried in vacuo to obtain 14.3 g. of dark blue violet powder (purity 26%). The powder was dissolved in 100 ml. of water and saturated with hydrogen sulfide to liberate the chelated metal as a sulfide. The dried material was dissolved in 10 ml. of 0.1 mole pyridine - acetic acid buffer (pH 6.0) and charged on 400 ml. of DEAE-Sephadex A-25 in a column (diameter 2 cm.) packed with the same buffer. Eluate was fractionated to fractions of 10 ml. each and activity was found in fractions Nos. 70–135, which were collected and dried in vacuo to obtain 1.8 g. of white powder (purity 90%). Recrystallization from hot methanol gave 1.1 g. of the crystals of bredinin (purity 100%).

Having described our invention we claim:

1. 4-carbamoyl-1-β-D-ribofuranosylimidazolium-5-olate, a compound of the formula

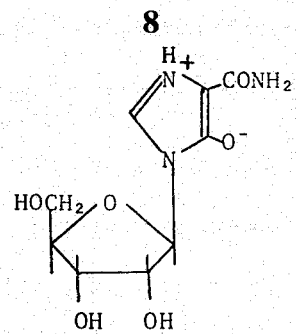

* * * * *